US012377564B2

(12) United States Patent
Guo et al.

(10) Patent No.: US 12,377,564 B2
(45) Date of Patent: Aug. 5, 2025

(54) BLADE DRIVING APPARATUS AND CUTTING DEVICE (71) Applicant: CONTEMPORARY AMPEREX TECHNOLOGY (HONG KONG) LIMITED, Hong Kong (CN)

(72) Inventors: Yitai Guo, Ningde (CN); Zhihua Wen, Ningde (CN); Keqiang Li, Ningde (CN); Yunru Shi, Ningde (CN); Cong Zhang, Ningde (CN); Jianlei Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 434 days.

(21) Appl. No.: 17/940,238

(22) Filed: Sep. 8, 2022

(65) Prior Publication Data

US 2023/0241794 A1  Aug. 3, 2023

Related U.S. Application Data (63) Continuation of application No. PCT/CN2022/092030, filed on May 10, 2022.

(30) Foreign Application Priority Data

Jan. 28, 2022  (CN) .......................... 202220238775.2

(51) Int. Cl.
*B26D 1/60* (2006.01)
*B26D 7/08* (2006.01)
*B26D 7/00* (2006.01)

(52) U.S. Cl.
CPC ................. *B26D 1/60* (2013.01); *B26D 7/08* (2013.01); *B26D 2007/0012* (2013.01)

(58) Field of Classification Search
CPC ..... B26D 1/60; B26D 7/08; B26D 2007/0012
See application file for complete search history.

(56) References Cited

U.S. PATENT DOCUMENTS 3,548,697 A * 12/1970 Heinz ................... B26F 1/3833
83/435.23
3,783,725 A * 1/1974 Payeur ...................... B27L 7/00
83/326

(Continued)

FOREIGN PATENT DOCUMENTS

CN  2077635 U  5/1991
CN  103492137 A  1/2014

(Continued)

OTHER PUBLICATIONS

The Japan Patent Office (JPO) Decision to Grant a Patent for Application No. 2022-554825 Jun. 4, 2024 5 Pages (including translation).

(Continued)

*Primary Examiner* — Omar Flores Sanchez
(74) *Attorney, Agent, or Firm* — ANOVA LAW GROUP, PLLC (57) ABSTRACT A blade driving apparatus configured to drive a blade of a cutting device to cut a web and includes an anvil and a slide assembly. The slide assembly includes a slide rail and a slide block that are slidably connected to each other. The slide block is connected to the anvil, and the slide block and the anvil move back and forth relative to the slide rail along a travel direction of the web. At least one of the slide rail or the slide block is made of a non-metallic material.

19 Claims, 3 Drawing Sheets

(56) References Cited

U.S. PATENT DOCUMENTS

| | | | | |
|---|---|---|---|---|
| 4,262,568 | A | * | 4/1981 | Wallis .................. B26D 7/01 |
| | | | | 83/262 |
| 4,653,362 | A | * | 3/1987 | Gerber .................. B26F 1/382 |
| | | | | 83/16 |
| 7,117,777 | B1 | * | 10/2006 | Wilkes ................ B21D 43/028 |
| | | | | 83/323 |
| 11,413,780 | B1 | * | 8/2022 | Boyd ..................... B26D 5/02 |
| 2005/0217451 | A1 | * | 10/2005 | Bavelloni ............. C03B 33/03 |
| | | | | 83/651 |
| 2009/0107314 | A1 | * | 4/2009 | Nasu ................... B26F 1/3826 |
| | | | | 83/403.1 |
| 2014/0083271 | A1 | * | 3/2014 | Lai ......................... B26D 1/60 |
| | | | | 83/310 |
| 2014/0174268 | A1 | | 6/2014 | Sale et al. |
| 2016/0026168 | A1 | * | 1/2016 | Crystal ............... B26D 7/2614 |
| | | | | 700/114 |
| 2023/0136322 | A1 | * | 5/2023 | Taniguchi ......... H01M 10/0404 |
| | | | | 83/168 |
| 2023/0249374 | A1 | * | 8/2023 | Lee ..................... B26D 7/1863 |
| | | | | 83/24 |

FOREIGN PATENT DOCUMENTS

| | | |
|---|---|---|
| CN | 107000612 A | 8/2017 |
| CN | 111430739 A | 7/2020 |
| CN | 112475412 A | 3/2021 |
| DE | 202018105755 U1 | 11/2019 |
| JP | 1988040299 A | 2/1989 |
| JP | 3010208 U | 4/1995 |
| JP | 2011161557 A | 8/2011 |
| JP | 2015020267 A | 2/2015 |
| KR | 20100019110 A | 2/2010 |
| KR | 20150103904 A | 9/2015 |
| KR | 102194743 B1 | 12/2020 |
| WO | 2012110915 A1 | 8/2012 |

OTHER PUBLICATIONS

Korean Intellectual Property Office (KIPO) Request for the Submission of an Opinion for Application No. 10-2022-7031553 Sep. 3, 2024 9 Pages (including translation).

The Japan Patent Office (JPO) Notification of Reasons for Refusal for Application No. 2022-554825 and Translation Feb. 27, 2024 6 Pages.

Korean Intellectual Property Office (KIPO) Office Action 1 for Application No. 10-2022-7031553 Mar. 25, 2024 9 Pages (including translation).

State Intellectual Property Office of China Notice of Grant of Invention Patent Right for Application No. 202220238775.2 Aug. 4, 2022 2 pages (including translation).

The European Patent Office (EPO) The Extended European Search Report for 22758112.1 Sep. 21, 2023 6 Pages.

The World Intellectual Property Organization (WIPO) International Search Report and Written Opinion for PCT/CN2022/092030 Jun. 29, 2022 12 Pages (including translation).

The Korean Intellectual Property Office Notice of Allowance for Application No. 10-2022-7031553 Jan. 2, 2025 10 Pages (including translation).

* cited by examiner

BLADE DRIVING APPARATUS AND CUTTING DEVICE

CROSS-REFERENCE TO RELATED APPLICATIONS

This application is a continuation of International Application No. PCT/CN2022/092030, filed on May 10, 2022, which claims priority to Chinese Patent Application No. 202220238775.2, filed on Jan. 28, 2022 and entitled "BLADE DRIVING APPARATUS AND CUTTING DEVICE", the entire contents of which are incorporated herein by reference.

TECHNICAL FIELD

This application relates to the technical field of lithium battery manufacturing, and in particular, to a blade driving apparatus and a cutting device.

BACKGROUND

Electrode plates of a lithium-ion battery are coated with a slurry, dried, and calendered to form a three-layer composite structure that includes a current collector and coating layers on both sides of the current collector. Subsequently, the electrode plates are cut according to a designed structure and specifications of the battery. Generally, for a jelly-roll-type battery, the electrode plates are slit according to a designed width. For a stacked-type battery, the electrode plates are cut into an appropriate size.

Currently, due to high requirements imposed on the efficiency of cutting the electrode plates of the battery, an apparatus for cutting electrode plates is designed as a follow-up cutting mechanism accordingly. To be specific, without reducing a travel speed of an electrode web, a blade in the apparatus for cutting electrode plates moves by following up the web in the travel direction of the web. The blade cuts the web when moving at a speed identical or similar to the travel speed of the web, thereby improving the cutting efficiency. However, in the follow-up cutting process, various interaction forces such as a frictional force exist between different mechanisms.

SUMMARY

An objective of this application is to provide a blade driving apparatus and a cutting device, so as to alleviate the problem that the drop of metallic particulate matters results in battery safety hazards, where the drop is caused by interaction forces between components of the blade driving apparatus.

According to a first aspect, this application provides a blade driving apparatus, configured to drive a blade in a cutting device to cut a web and includes: an anvil; and a slide assembly, including a slide rail and a slide block that are slidably connected to each other, where the slide block is connected to the anvil, and the slide block and the anvil move back and forth relative to the slide rail along a travel direction of the web, and at least one of the slide rail or the slide block is made of a non-metallic material.

Because either the slide rail or the slide block that makes up the slide assembly is made of a non-metallic material, the structure formed in the foregoing connection manner incurs lesser wear of metal materials during operation, and in turn, generates no metallic particulate matters, thereby alleviating the problem that the drop of metallic particulate matters results in battery safety hazards during cut driving.

In some embodiments, the blade driving apparatus further includes: a connecting block, where the connecting block is connected to the anvil; and a blade driving rod, where the blade driving rod includes a first end and a second end, the first end is connected to the connecting block, and the second end is connected to the blade. At least one of the connecting block or the blade driving rod is made of a non-metallic material.

Because either the connecting block or the blade driving rod is made of a non-metallic material, the structure formed in the foregoing connection manner incurs lesser wear of metal materials during operation, and in turn, generates no metallic particulate matters, thereby alleviating the problem that the drop of metallic particulate matters results in battery safety hazards during cut driving.

In some embodiments, a connecting slot is provided at the connecting block and is configured to accommodate the first end of the blade driving rod, and the connecting slot is in clearance fit with the first end of the blade driving rod. The clearance-fit connection manner simplifies the connection between the connecting block and the blade driving rod, so that some extent of errors of the mounting position is tolerated, and the mounting is facilitated.

In some embodiments, the clearance fit is such that a radial width of the first end of the blade driving rod is less than a radial width of the connecting slot. By setting the radial width difference, it is easier to mount and replace the blade driving rod, and some extent of errors of manufacturing and mounting is tolerated.

In some embodiments, the connecting slot and the first end of the blade driving rod are T-shaped. The T-shaped connecting slot and the T-shaped first end are simple in structure and convenient to disassemble and assemble, and involve relatively few production steps and are convenient connection manners.

In some embodiments, the blade driving apparatus further includes a cut drive assembly. The slide assembly is connected to the cut drive assembly, and moves back and forth along a direction perpendicular to the travel direction of the web as driven by the cut drive assembly. The slide assembly is connected to the cut drive assembly, so that a driving force for cutting is transmitted to the blade. At least one of the slide rail or the slide block in the slide assembly is made of a non-metallic material. Therefore, when an interaction force is generated between the slide rail and the slide block, no metallic particulate matters are generated, thereby further avoiding safety hazards.

In some embodiments, the cut drive assembly includes a cut drive motor and a cam follow-up structure that are connected to each other, and the cam follow-up structure is connected to the slide assembly. Through the foregoing structure, a rotary motion of the cut drive motor can be converted into a reciprocating movement perpendicular to the travel direction of the web, thereby implementing web cutting.

In some embodiments, the blade driving apparatus further includes a follow-up drive assembly. The anvil is connected to the follow-up drive assembly, and moves back and forth along the travel direction of the web as driven by the follow-up drive assembly. The follow-up drive assembly provides a driving force consistent with the travel direction of the web in a follow-up cutting process, so that the blade moves synchronously with the web; and provides, after completion of the follow-up cutting process, a driving force opposite to the travel direction of the web to drive resetting of the blade, so as to implement the reciprocating movement in the travel direction.

In some embodiments, the anvil includes a first connecting plate and a second connecting plate that are connected to each other. The first connecting plate is further connected to the slide block and a connecting block separately. The second connecting plate is further connected to the follow-up drive assembly. The anvil includes two parts, that is, the first connecting plate and the second connecting plate, so that the anvil can be mounted more flexibly by fitting with other components.

According to a second aspect, this application provides a cutting device. The cutting device includes the blade driving apparatus according to the foregoing embodiment.

The foregoing description is merely an overview of the technical solutions of this application. The following expounds specific embodiments of this application to enable a clearer understanding of the technical solutions of this application, enable implementation based on the content of the specification, and make the foregoing and other objectives, features, and advantages of this application more evident and comprehensible.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

The drawings are not drawn to scale.

REFERENCE NUMERALS

100—blade driving apparatus; 10—blade driving rod; 11—first end of the blade driving rod; 20—follow-up drive assembly; 21—anvil; 21a—first connecting plate; 21b—second connecting plate; 30—cut drive motor; 31—cam follow-up structure; 40—connecting block; 41—connecting slot; 50—slide assembly; 51—linear guide rail; 52—slide rail; 53—slide block; 60—holder; 61—bottom plate; 62—vertical plate.

DETAILED DESCRIPTION OF EMBODIMENTS

The following gives a more detailed description of implementations of this application with reference to drawings and embodiments. The detailed description of the following embodiments and the accompanying drawings are intended to exemplarily describe the principles of this application, but not to limit the scope of this application. Therefore, this application is not limited to the described embodiments.

Unless otherwise defined, all technical and scientific terms used herein have the same meanings as usually understood by a person skilled in the technical field of this application. The terms used herein are merely intended for describing specific embodiments but are not intended to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish different objects but not intended to indicate or imply relative importance or implicitly specify the number of the indicated technical features, the specific order, or order of priority. In the description of the embodiments of this application, unless otherwise expressly specified, "a plurality of" means two or more.

Reference to "embodiment" herein means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of this application, unless otherwise expressly specified and qualified, the technical terms such as "mounting", "concatenation", "connection", and "fixing" need to be understood in a broad sense, for example, understood as a fixed connection or a detachable connection or understood as being integrated into a whole; or understood be as a mechanical connection or an electrical connection, a direct connection or an indirect connection implemented through an intermediary; or understood as interior communication between two components or interaction between two components. A person of ordinary skill in the art understands the specific meanings of the terms in the embodiments of this application according to the context.

Currently, to ensure cutting precision in a process of cutting electrode plates, the movement of a web needs to be stopped or slowed down during cutting, thereby reducing the cutting efficiency. In order to improve the cutting efficiency of the electrode plates of a battery, without reducing a travel speed of an electrode web, a blade in the apparatus for cutting electrode plates moves by following up the web in the travel direction of the web, and the blade cuts the web when moving at a speed identical or similar to the travel speed of the web. Such a cutting manner is also referred to as follow-up cutting, and the electrode plate cutting device is referred to as an electrode plate follow-up cutting device. However, the following disadvantages are found in the existing electrode plate cutting device:

During the cutting, on the one hand, the blade needs to move back and forth along the travel direction of the web to follow up the electrode web. On the other hand, the blade needs to move back and forth along a direction perpendicular to the travel direction of the web to cut the electrode web into plates. Due to friction in the two directions, if two components rubbing against each other are both made of metal, an amount of metallic particulate matters will be generated under the friction. The metallic particulate matters dropping onto the electrode plates directly contaminate the electrode plates, are prone to cause an internal short circuit in the battery, self-discharge, and even thermal runaway, thereby posing battery safety hazards.

Figure 1:
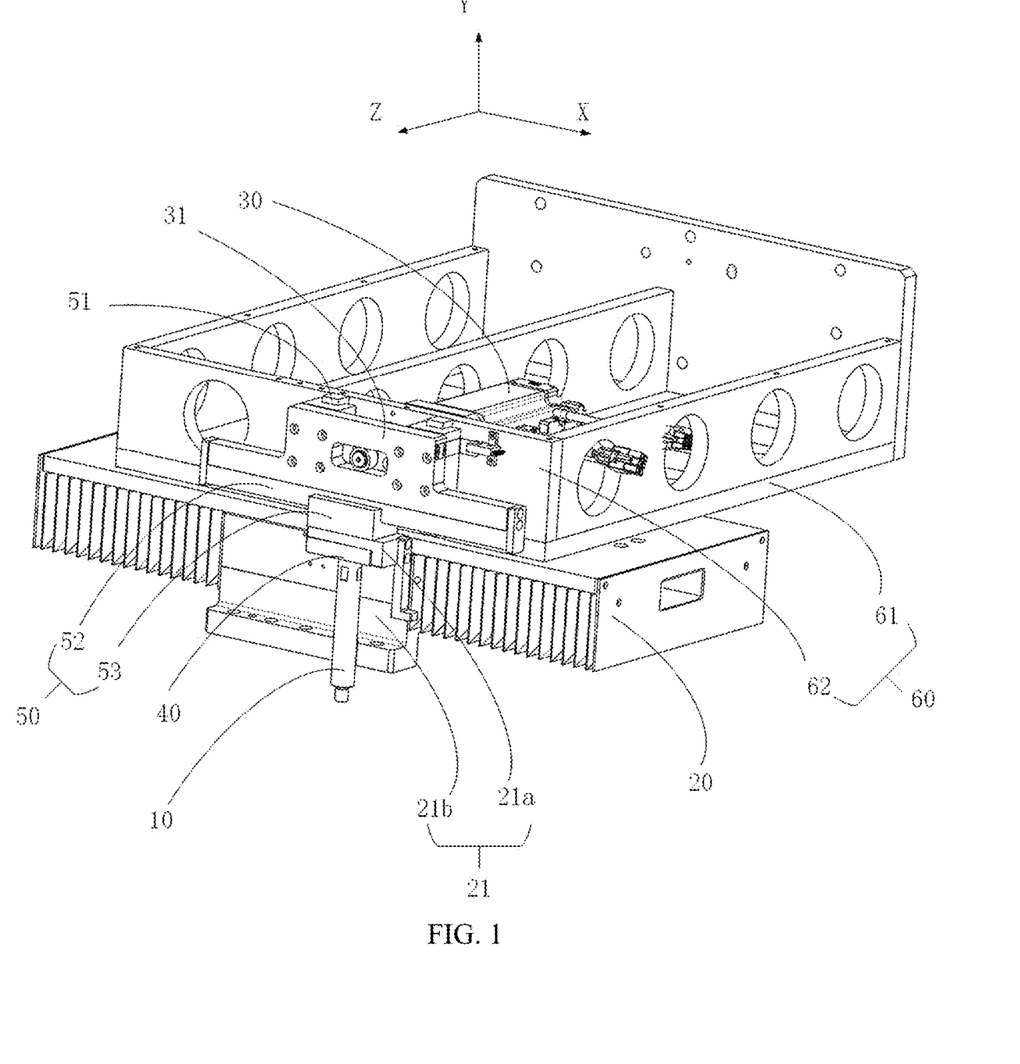
FIG. 1 is a schematic structural diagram of a blade driving apparatus according to some embodiments of this application.
Figure 2:
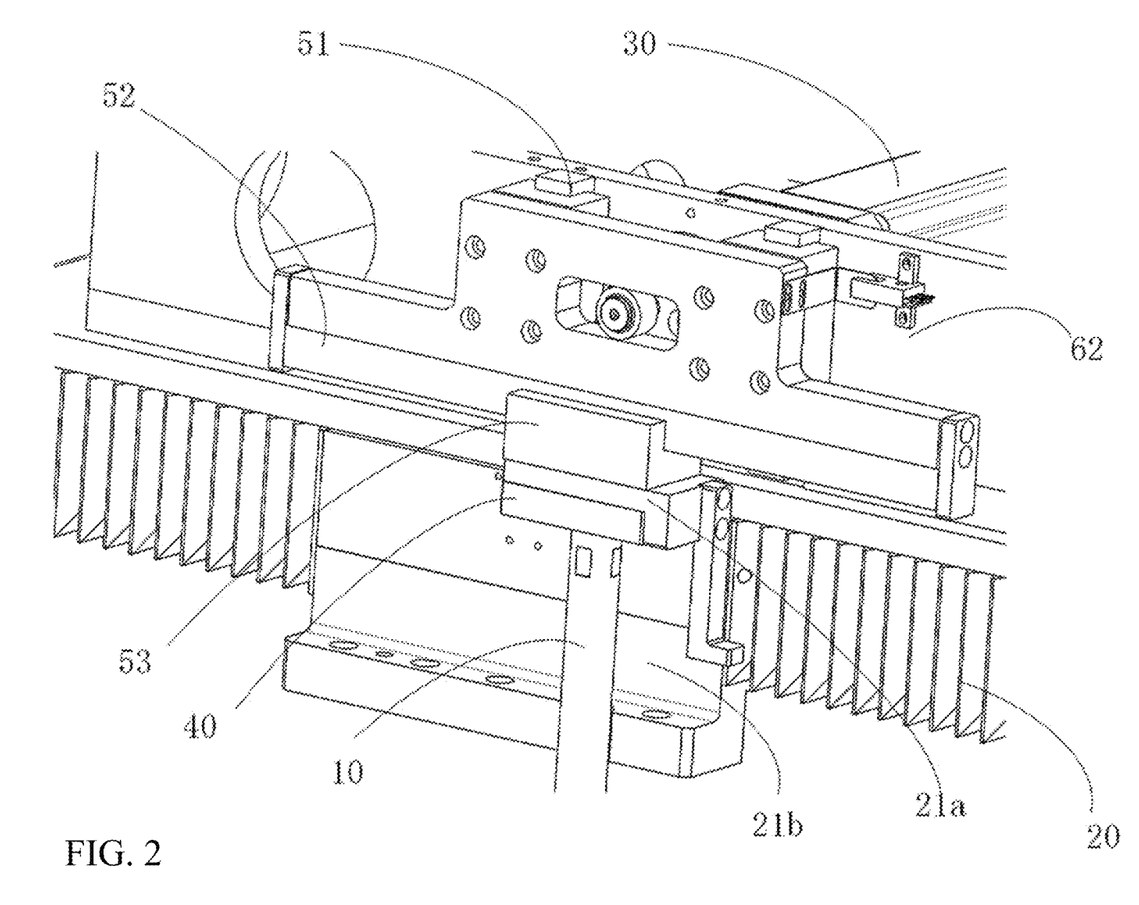
FIG. 2 is a structural close-up view of a movable adaptor in a driving apparatus according to some embodiments of this application.
Figure 3:
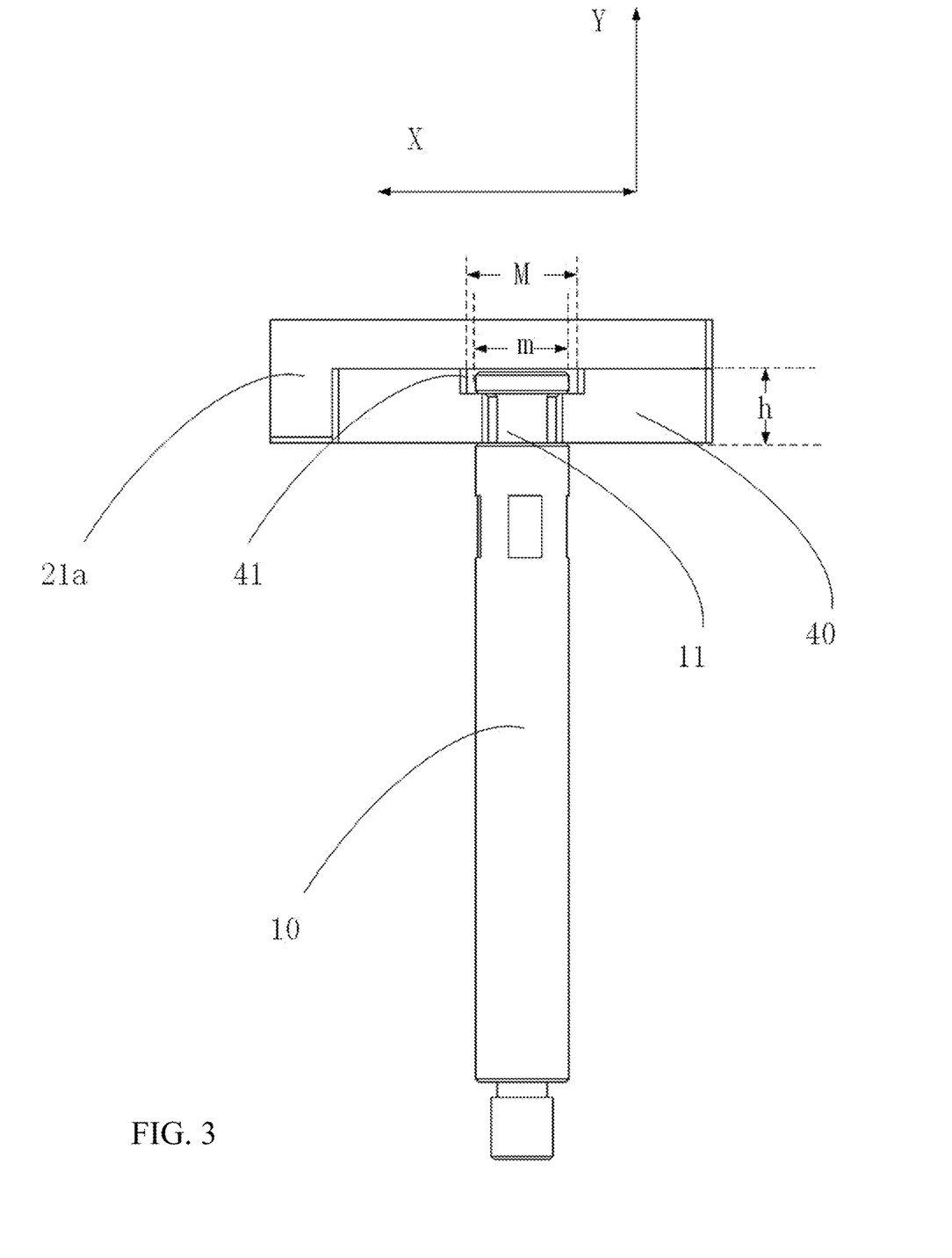
FIG. 3 is a schematic diagram of a connecting block and a blade driving rod in a driving apparatus according to some embodiments of this application.

To solve the foregoing problem, as shown in FIG. 1 to FIG. 3, an embodiment of this application provides a blade driving apparatus 100 configured to drive a blade to cut a web. The blade driving apparatus is configured to drive the blade in a cutting device to cut the web, and includes: an anvil 21 and a slide assembly 50. The slide assembly 50 includes a slide rail 52 and a slide block 53 that are slidably connected to each other. The slide block 53 is connected to the anvil 21. The slide block 53 and the anvil 21 move back and forth relative to the slide rail 52 along a travel direction of the web. At least one of the slide rail 53 or the slide block 52 is made of a non-metallic material.

During the production, an electrode plate is wound into rolls. The electrode plate is also known as a web. Before being cut, the web is spread and conveyed as driven by an in-feed roller or an out-feed roller. The movement direction of the web is called a travel direction of the web. The web is not shown in the drawings. For ease of description, the travel direction of the web is an X direction, for example. The anvil 21 is connected to the follow-up drive assembly 20. The follow-up drive assembly 20 can drive the anvil 21 to move back and forth along the X direction, that is, the travel direction of the web. The slide assembly 50 includes a slide rail 52 and a slide block 53. The shape of the slide rail 52 fits with the shape of the slide block 53, so that the slide block 53 can slide on the slide rail 52 along the X direction but without moving relatively in the Y or Z direction. In FIG. 1, for example, an upper part of the slide block 53 is slidably connected to the slide rail 52, and a lower part is connected to the anvil 21. When the travel direction of the web is the X direction, the follow-up drive assembly 20 drives the anvil 21 and the slide block 53 connected to the anvil 21 to move back and forth relative to the slide rail 52 along the X direction. The non-metallic material is plastic, nylon material, or the like, and does not generate particles when rubbing against each other. The type of the non-metallic material is not specifically limited herein.

If both the slide rail 52 and the slide block 53 are made of metal materials, metallic particulate matters will be generated when the slide rail and the slide block rub against each other during sliding. The metallic particulate matters drop into the electrode plate to cause safety hazards. Therefore, one of the slide rail 52 or the slide block 53 is made of or both are made of non-metallic materials, so as to avoid the risk of generating metallic particulate matters.

According to some embodiments of this application, referring to FIG. 1 to FIG. 3, the blade driving apparatus further includes: a connecting block 40, where the connecting block 40 is connected to the anvil 21; and a blade driving rod 10, where the blade driving rod 10 includes a first end 11 and a second end. The first end is connected to the connecting block 40, and the second end is connected to the blade (not shown). At least one of the connecting block 40 or the blade driving rod 10 is made of a non-metallic material.

The connecting block 40 is configured to connect the anvil 21 and the first end 11 of the blade driving rod 10. As an example, the first end shown in the drawing is an upper end of the blade driving rod 10. A lower end of the blade driving rod 10 is connected to the blade (not shown in the drawing) configured to cut the web, and drives the blade to move along a Y direction to cut the web.

In the process of cutting the web, the blade driving rod 10 bears a relatively great pressure. Therefore, the blade driving rod 10 is usually made of a metal material. The connecting block 40 is connected to the first end of the blade driving rod 10. An interaction force is generated between the connecting block and the first end in the process of cutting the web. If the connecting block 40 and the blade driving rod 10 are both made of metal materials, metallic particulate matters will be generated due to the interaction force. Therefore, the use of the connecting block 40 made of non-metallic materials can effectively avoid the generation of metallic particulate matters. Definitely, due to the progress of material technology, the blade driving rod 10 may be made of a non-metallic material of a relatively high structural strength instead. In this case, the connecting block 40 may be made of a metal material or a non-metallic material. The generation of metallic particulate matters can be effectively avoided as long as at least one of the blade driving rod 10 or the connecting block 40 is made of non-metallic materials.

According to some embodiments of this application, referring to FIG. 1 to FIG. 3, a connecting slot 41 is provided at the connecting block 40 and is configured to accommodate the first end 11 of the blade driving rod 10. The connecting slot 41 is in clearance fit with the first end 11 of the blade driving rod 10.

As shown in FIG. 3, the connecting slot 41 is made on the connecting block 40, and can accommodate the first end 11 of the blade driving rod 10. When driving the blade to move back and forth in the Y direction to cut the web, the blade driving rod 10 is prevented from coming out of the connecting slot 41. The clearance fit means that the connecting slot 41 and the first end 11 of the blade driving rod 10 are mounted by fitting with each other in shape, but at a clearance in between.

Affected by a cutting reaction force, the blade needs to be replaced after working for a long period. The mechanical connection manner between the connecting block 40 and the blade driving rod 10 can further facilitate assembling and disassembling of the connecting block 40 and the blade driving rod 10, and in turn, facilitate mounting and maintenance. In addition, due to the clearance between the connecting slot and the first end of the blade driving rod, some extent of error of the mounting position is tolerated, thereby reducing the difficulty of mounting.

According to some embodiments of this application, the clearance fit is such that a radial width m of the first end 11 of the blade driving rod is less than a radial width M of the connecting slot 41.

As shown in FIG. 3, the radial width of the connecting slot is M, and the radial width of the first end of the blade driving rod is m, where M is greater than m. By setting the radial width difference, it is easier to mount and replace the blade driving rod, and some extent of errors of manufacturing and mounting is tolerated. In addition, in some embodiments, a height of the first end 11 of the blade driving rod is substantially the same as a height of the connecting slot 41, and is h, so that a full fit can be implemented. In this way, the Y-direction blade driving rod 10 and the connecting block 40 are relatively fixed, thereby preventing the blade from shaking when the blade driving rod 10 moves back and forth along the Y direction.

According to some embodiments of this application, the connecting slot 41 and the first end 11 of the blade driving rod are T-shaped.

As shown in FIG. 3, the T-shape means that a projection viewed along a Z direction is a T-shape.

The T-shaped connecting slot 41 and the T-shaped first end 11 are simple in structure and convenient to disassemble and assemble, and involve relatively few production steps and are convenient connection manners.

According to some embodiments of this application, the blade driving apparatus further includes a cut drive assembly. The slide assembly is connected to the cut drive assembly, and moves back and forth along a direction perpendicular to the travel direction of the web as driven by the cut drive assembly.

The cut drive assembly is configured to provide a driving force for a cutting action of the blade, so that the blade can move back and forth in the Y direction, that is, a direction perpendicular to the travel direction of the web, to cut the web.

The slide assembly is connected to the cut drive assembly, so that a driving force for cutting is transmitted to the blade. At least one of the slide rail or the slide block in the slide assembly is made of a non-metallic material. Therefore, when an interaction force is generated between the slide rail and the slide block, no metallic particulate matters are generated, thereby further avoiding safety hazards.

According to some embodiments of this application, the cut drive assembly includes a cut drive motor 30 and a cam follow-up structure 31 that are connected to each other, and the cam follow-up structure 31 is connected to the slide assembly 50.

The cut drive motor is configured to provide cutting power for the blade to cut the web. The cutting power is transmitted to the slide assembly through the cam follow-up structure. The cam follow-up structure includes a cam and a bearing follower. The cam is mounted on a rotating shaft of the cut drive motor 30. The bearing follower is provided at the flank of the cam and is adapted to rotate as driven by the cam. Through the foregoing structure, a rotary motion of the cut drive motor 30 can be converted into a reciprocating movement along the Y direction, thereby implementing web cutting.

According to some embodiments of this application, the blade driving apparatus further includes a follow-up drive assembly 20. The anvil 21 is connected to the follow-up drive assembly 20, and moves back and forth along the travel direction of the web as driven by the follow-up drive assembly.

The follow-up drive assembly 20 is adapted to provide a reciprocating driving force in the X direction, that is, the travel direction of the web, and is adapted to: provide a driving force consistent with the travel direction of the web in a follow-up cutting process so that the blade moves synchronously with the web; and provide, after completion of the follow-up cutting process, a driving force opposite to the travel direction of the web to drive resetting of the blade, so as to implement the reciprocating movement in the X direction.

The follow-up drive assembly may include a rack and a follow-up drive motor. The rack is arranged along the X direction. The drive motor may be mounted on the anvil 21. A gear that fits in with the rack is provided at the rotating shaft, and is adapted to drive, through the fit between the gear and the rack, the anvil 21 to move on the rack to implement a reciprocating movement in the X direction. Because teeth of the rack are arranged in the Y direction, the anvil 21 can move in the Y direction, and therefore, can be compatible with the Y-direction driving of the cut drive assembly.

According to some embodiments of this application, the anvil 21 includes a first connecting plate 21a and a second connecting plate 21b that are connected to each other. The first connecting plate 21a is further connected to the slide block 53 and a connecting block 40 separately. The second connecting plate 21b is further connected to the follow-up drive assembly 20.

As shown in FIG. 1 to FIG. 3, the anvil includes two parts, that is, the first connecting plate and the second connecting plate, so that the anvil can be mounted more flexibly by fitting with other components. The first connecting plate and the second connecting plate can be made of metal materials due to no rubbing against other components. In this way, no metallic particulate matters will be generated on the basis of providing sufficient structural strength. Definitely, the connecting plates may be made of non-metallic materials of relatively high structural strength instead, without being limited herein. The first connecting plate 21b may be L-shaped, thereby further increasing structural strength. The first connecting plate 21a connects the slide block 53 and the connecting block 40, and transmits the power of the cut drive assembly along the Y direction to the blade, thereby implementing the reciprocating movement of the blade along the Y direction to cut the web. The second connecting plate 21b is connected to the follow-up drive assembly 20, so as to transmit the power of the follow-up drive assembly along the X direction to the blade, thereby implementing the reciprocating movement of the blade along the X direction, that is, the travel direction of the web, to follow up the web.

According to some embodiments of this application, this application further provides a cutting device. The cutting device includes the blade driving apparatus 100 according to any one of the foregoing solutions.

According to some embodiments of this application, optionally, the cutting device further includes a holder 60. A cut drive assembly, a follow-up drive assembly 20, and a Y-direction linear guide rail 51 are mounted on the holder 60. The cut drive assembly includes a cut drive motor 30 and a cam follow-up structure 31. The follow-up drive assembly 20 includes a rack. The holder 60 includes at least a bottom plate 61 arranged along an X-Z plane and a vertical plate 62 that is perpendicular to the bottom plate 61 and parallel to the travel direction of the web, that is, along an X-Y plane. A cut drive motor 30 with a rotating shaft oriented toward the vertical plate 62 is mounted on an upper surface of the bottom plate 61. The rotating shaft passes through the vertical plate 62. The linear guide rail 51 is mounted on the vertical plate 62. There are two linear guide rails 51, arranged on two sides of the cut drive motor 30, and adapted to implement vertical sliding of the slide rail 52, so as to transmit a cut driving force in the Y direction to the blade.

By disposing the holder 60 and mounting the cut drive motor 30, the follow-up drive assembly 20, and the linear guide rails 51 on the holder 60, the space layout is optimized, and the overall structure is more reasonable and compact.

Finally, it needs to be noted that the foregoing embodiments are merely intended for describing the technical solutions of this application other than limiting this application. Although this application is described in detail with reference to the foregoing embodiments, persons of ordinary skill in the art understand that they may still make modifications to the technical solutions described in the foregoing embodiments or make equivalent replacements to some or all technical features thereof, without departing from the scope of the technical solutions of the embodiments of this application.

What is claimed is:

1. A blade driving apparatus, comprising:
    an anvil;
    a slide assembly, comprising a slide rail and a slide block that are slidably connected to each other;
    a connecting block connected to the anvil; and
    a blade driving rod, the blade driving rod comprising an end connected to the connecting block;
    wherein the slide block is connected to the anvil, and the slide block and the anvil move back and forth relative to the slide rail along a travel direction of a web.

2. The blade driving apparatus according to claim 1, wherein at least one of the connecting block or the blade driving rod is made of a non-metallic material.

3. The blade driving apparatus according to claim 1, wherein a connecting slot is provided at the connecting block and is configured to accommodate the end of the blade driving rod, and the connecting slot is in clearance fit with the end of the blade driving rod.

4. The blade driving apparatus according to claim 3, wherein the clearance fit is such that a radial width of the end of the blade driving rod is less than a radial width of the connecting slot.

5. The blade driving apparatus according to claim 3, wherein the connecting slot and the end of the blade driving rod are T-shaped.

6. The blade driving apparatus according to claim 1, further comprising:
    a cut drive assembly;
    wherein the slide assembly is connected to the cut drive assembly, and is configured to be driven by the cut drive assembly to move back and forth along a direction perpendicular to the travel direction of the web.

7. The blade driving apparatus according to claim 6, wherein the cut drive assembly comprises a cut drive motor and a cam follow-up structure that are connected to each other, and the cam follow-up structure is connected to the slide assembly.

8. The blade driving apparatus according to claim 1, further comprising:
    a follow-up drive assembly;
    wherein the anvil is connected to the follow-up drive assembly, and is configured to be driven by the follow-up drive assembly to move back and forth along the travel direction of the web.

9. The blade driving apparatus according to claim 8, wherein:
    the anvil comprises a first connecting plate and a second connecting plate that are connected to each other;
    the first connecting plate is further connected to the slide block and the connecting block; and
    the second connecting plate is further connected to the follow-up drive assembly.

10. A cutting device, comprising:
    a blade driving apparatus comprising:
        an anvil;
        a slide assembly, comprising a slide rail and a slide block that are slidably connected to each other;
        a connecting block connected to the anvil; and
        a blade driving rod, the blade driving rod comprising an end connected to the connecting block;
        wherein the slide block is connected to the anvil, and the slide block and the anvil move back and forth relative to the slide rail along a travel direction of a web.

11. The cutting device according to claim 10, wherein at least one of the connecting block or the blade driving rod is made of a non-metallic material.

12. The cutting device according to claim 10, wherein a connecting slot is provided at the connecting block and is configured to accommodate the end of the blade driving rod, and the connecting slot is in clearance fit with the end of the blade driving rod.

13. The cutting device according to claim 12, wherein the clearance fit is such that a radial width of the end of the blade driving rod is less than a radial width of the connecting slot.

14. The cutting device according to claim 12, wherein the connecting slot and the end of the blade driving rod are T-shaped.

15. The cutting device according to claim 10, wherein:
    the blade driving apparatus further comprises a cut drive assembly; and
    the slide assembly is connected to the cut drive assembly, and is configured to be driven by the cut drive assembly to move back and forth along a direction perpendicular to the travel direction of the web.

16. The cutting device according to claim 15, wherein the cut drive assembly comprises a cut drive motor and a cam follow-up structure that are connected to each other, and the cam follow-up structure is connected to the slide assembly.

17. The cutting device according to claim 10, wherein:
    the blade driving apparatus further comprises a follow-up drive assembly; and
    the anvil is connected to the follow-up drive assembly, and is configured to be driven by the follow-up drive assembly to move back and forth along the travel direction of the web.

18. The cutting device according to claim 17, wherein:
    the anvil comprises a first connecting plate and a second connecting plate that are connected to each other;
    the first connecting plate is further connected to the slide block and the connecting block; and
    the second connecting plate is further connected to the follow-up drive assembly.

19. A blade driving apparatus, comprising:
    an anvil;
    a slide assembly, comprising a slide rail and a slide block that are slidably connected to each other; and
    a follow-up drive assembly;
    wherein:

the slide block is connected to the anvil, and the slide block and the anvil move back and forth relative to the slide rail along a travel direction of a web; and the anvil is connected to the follow-up drive assembly, and is configured to be driven by the follow-up drive assembly to move back and forth along the travel direction of the web.

\* \* \* \* \*